Feb. 3, 3,493,756
F MATERIALS
Filed May 27, 1965
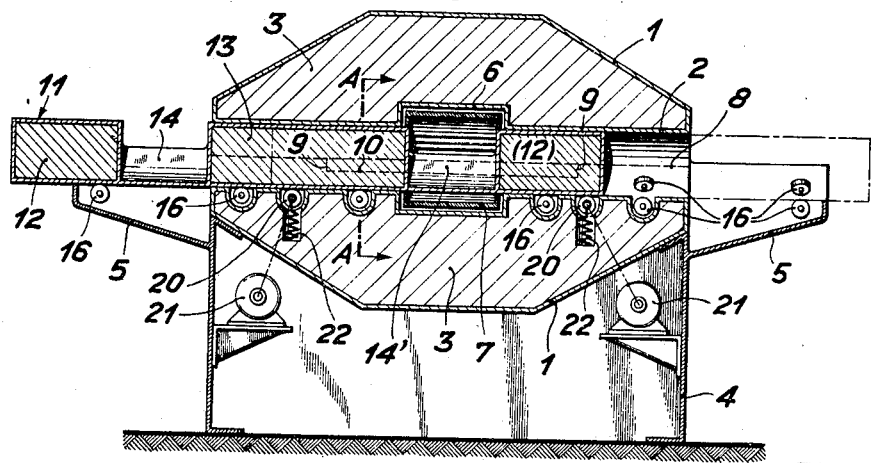
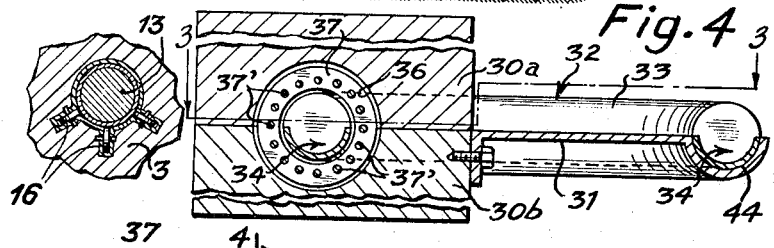
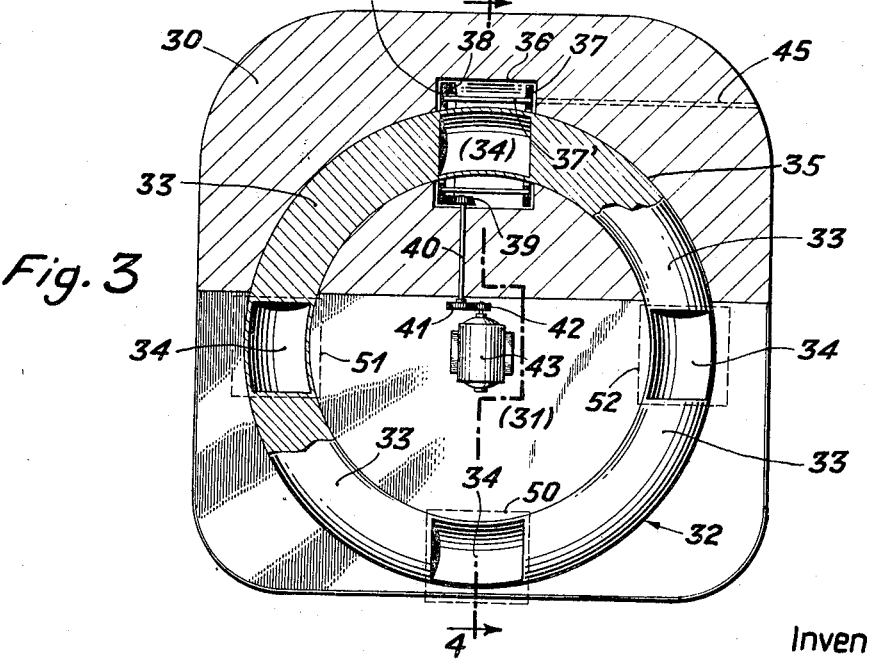
Inventor:
Beda Latzer
BY Pennie, Edmonds,
Morton, Taylor and Adams
ATTORNEYS

United States Patent Office 3,493,756
Patented Feb. 3, 1970

3,493,756
SHIELDED APPARATUS FOR EFFECTING IRRADIATION OF MATERIALS
Beda Latzer, Winterthur, Switzerland, assignor to Sulzer Brothers Limited, Winterthur, Switzerland, a company of Switzerland
Filed May 27, 1965, Ser. No. 459,149
Claims priority, application Switzerland, June 1, 1964, 7,144/64
Int. Cl. G21h 5/00
U.S. Cl. 250—106    1 Claim

ABSTRACT OF THE DISCLOSURE

There is disclosed apparatus for exposing material to radiation, such as gamma rays for example, with shielding from the environment. The apparatus includes a radiation-absorbing mass having a curved passage of circular cross-section extending therethrough. A cylindrical enlargement is formed in the mass about and communicating with this passage intermediate the ends thereof. A movable member is provided in the form of a ring, also made of radiation-absorbing material, and having recesses formed therein for the reception of material to be irradiated. This ring fits in and has substantially the same cross-section as the passage through the absorbing mass, and by motion with respect to that mass the recesses or cavities in the member can be brought into the enlargement above mentioned within which radiation sources are provided. In particular, there is shown a support having the shape of a squirrel cage which is rotatably disposed in this enlargement, surrounding the movable member and having rod-like radiation sources about its periphery. A channel extends from the enlargement to the exterior of the absorbing mass in position to permit withdrawal and replacement of the radiation sources.

---

The present invention relates to apparatus for subjecting material to radiation, such as gamma rays for example, in the manufacture or processing of such material. Apparatus of this kind may comprise a radiation block or shield with a cavity therein for receipt of a source of radiation. A passage is formed in the block, extending from the surface of the block to the cavity, and a carriage for support of material to be irradiated, having plug-like or piston-like portions, fits this passage so as to permit the transport of material to the cavity where it is exposed to radiation, the carriage serving at the same time to prevent the escape of radiation to the exterior of the shield. This carriage is hence sometimes referred to herein as a piston.

It has been heretofore proposed to provide apparatus of this general character in which the piston moves vertically. In accordance with the invention instead, the piston has a horizontal motion and includes at least two chambers for reception of material to be irradiated.

By contrast with the prior art, the apparatus according to the invention presents the advantages that drive of the piston is easier to provide for and does not require counterweights. The horizontal disposition of the piston travel also makes it possible to provide in the piston more than a single chamber for reception of material to be irradiated. This results in more economical operation, since the operations of loading and withdrawal of material to be irradiated can be carried on at one or more such chambers while irradiation proceeds at another. The horizontal disposition of the piston according to the invention also means more convenient working heights for the operator. The walls of the material receiving chambers which hold the various portions of the movable plug or piston together may also be made of thinner sections since they are not obliged to support the weight of the piston. The result is a better utilization of the radiation and also a more uniform level of radiation.

Additional advantages are obtained if the piston is borne on rollers. These reduce the friction of motion of the piston. In addition, since they permit the position of the piston transversely of its path of motion to be accurately adjusted, they make it possible to provide smaller radial clearance between the piston and the walls of its passage through the shield. It is also advantageous to propel the piston by means of driven supporting rollers therefor. This provides a simple form of construction which also forms a slip clutch between the piston and drive source, preventing damage to the driving mechanism, if the piston should become blocked or jammed.

According to a further feature of the invention, the axis of the piston or carriage may be bent into a circular path. This permits a reduction in the overall dimensions of the apparatus and simultaneously an increase in the number of chambers for reception of material to be irradiated. Additionally, a single loading and unloading station may be provided in such an embodiment.

The radiation source usually comprises rod-like elements which may be disposed by means of a grid-work or basket in an annular array surrounding the piston. For replacement of the elements, this grid-work may then be removed integrally or in parts.

If the grid-work is made rotatable about its axis, and if it is further provided with a drive, then if the elements are of unequal strength, the material to be irradiated may nevertheless be subjected to uniform radiation by effecting continuous or discontinuous rotation of the grid-work during the exposure time.

The invention will now be further described with reference to the accompanying drawings in terms of two non-limitative exemplary embodiments of the invention.

In these drawings:

FIG. 1 is a vertical longitudinal section through one form of irradiation apparatus according to the invention having a straight piston or carriage;

FIG. 2 is a sectional view taken on the line of A—A of FIG. 1;

FIG. 3 is a plan view partly in section taken on the line 3—3 of FIG. 4, of an embodiment of the invention in which the carriage for support of material to be irradiated is circular in shape, traveling along its own peripheral length to carry the material to and from the radiation source inside the shield; and FIG. 4 is a sectional view taken on the line 4—4 of FIG. 3.

In FIG. 1 the block or shield comprises an outer sheath 1, a horizontal cylindrical inner tube or liner 2, and a mass of lead 3 between the two as radiation absorbing material. The block rests upon a supporting frame 4 which may be extended at either side by means of brackets 5 aligned with tube 2. At the mid-point thereof the tube is provided with an enlargement 6 in which a basket or grid-work 7 having the shape of a hollow cylinder is provided for support for the radiation source elements.

The block may be made in two parts or halves, which join together along a horizontal plane indicated by the dash line 8 in FIG. 1. Advantageously however the upper half includes a stud-like protrusion as indicated at reference characters 9 and 10, which is received in a corresponding cavity in the lower half. When so interfitted a continuous cylindrical bore extends through both, receiving the liner 2 within which the piston 11 moves.

The piston or carriage, generally indicated at 11, comprises two lead filled end portions 12, a lead filled middle portion 13, and two chambers 14 and 14' for the reception of material to be irradiated, all coupled together for motion as a unit. The chambers 14 and 14' have semi-cylindrical walls by means of which the portions 12 are coupled to the portion 13. The piston rests on rollers 16 journaled in the block, which support it at the bottom and sides thereof. The rollers are disposed in suitable cavities provided in the block 3.

Motion of the piston is effected by means of two drive rollers 20 which are coupled to drive motors 21 (FIG. 1) by linkage mechanism indicated by means of dashed lines. The driving rollers are pressed against the piston by means of springs 22. They can however be disposed to bear on the upper side of the piston, so that their driving pressure against the piston need not be limited by the weight of the latter.

The drive motors 21 may be controlled together by conventional means not shown including timing switches, limit switches, interlocks, and devices to protect against unauthorized operation thereof. If low speeds of drive are sufficient a single driving motor may suffice.

While FIG. 2 shows the use of supporting rollers in threes, two pairs of supporting rollers may be used instead.

The apparatus of FIG. 1 operates as follows:

The material to be irradiated, which may for example be a liquid supported in a reagent vessel, is introduced into the irradiation chamber 14. If desired a light aluminum cage may be provided to define accurately the position of the material in the chamber, which in the embodiment shown has the shape of a semi-cylindrical trough. The piston is then driven to the location indicated by the chain lines in FIG. 1, with its left end just to the left of the left-hand drive roller 20 and with its right end supported by the right-hand bracket 5. With the piston in this position, the chamber 14 lies within the eenlargement 6 of tube 2 and is exposed to radiation from the sources in the basket or grid 7 for a predetermined time during which the right-hand chamber 14' may be loaded with fresh material to be irradiated. After expiration of the desired radiation interval the piston is shifted to the left (i.e. back to the position shown therefor in full lines in FIG. 1) and the material which has been irradiated is withdrawn from the chamber 14 while that in the chamber 14' will be subjected to irradiation, and so on.

In the irradiation apparatus of FIGS. 3 and 4, the block or shielding mass is denoted by reference character 30.

It comprises upper and lower halves 30a and 30b to which is attached a leaf or table 31 for support of that part of the ring-shaped carriage generally indicated at 32 which is not within the shield 30. A cavity or passage 35 is formed in the shield having the shape of part of a torus, say 150° thereof. The table 31 has a trough 44 formed therein, extending over the remainder of the circle, as shown in FIG. 3. A ring-shaped carriage or "piston" 32 is supported partly within the cavity 35 and for the rest in the trough 44 of the table. More particularly, the carriage 32 is supported both within the shield 30 and on the table 31 by means of rollers similar to the rollers 16 of FIG. 1, but which have not been shown in FIGS. 3 and 4. The carriage may be caused to rotate about its center and in the plane of FIG. 3 by means of driving rollers of the kind shown in FIG. 1 at 20, with appurtenant driving motors 21.

The carriage 32 includes four chambers or recesses 34 for the reception of material to be irradiated. These may be spaced 90° apart as shown in the drawing, and are separated one from another by four segments 33 having good radiation absorptive, i.e. shielding properties.

The block 30 is provided with a cylindrical cavity 36 as an enlargement of the cavity 35. A rotatable annular basket or grid-work 37 fits within cavity 36 about the ring-shaped carriage 32 and functions as a support to carry a number of rod-like radiation source elements 37'. These may for example be of gamma-radiation producing cobalt-60. The basket has a ring 38 of conical gear teeth, engaged by a conical gear 39 which is driven from an electric motor through spur gears 41 and 42 and a shaft 40.

The block 33 is provided with a radiation source exchange opening 45 through which the individual radiation elements can be withdrawn and replaced in known fashion. For this purpose the basket 37 is driven by elements 38 to 43 in order to bring the elements to be changed into alignment with the replacement passage 45.

The apparatus of FIGS. 3 and 4 is suitable for radiation of individual workloads or of workloads in succession.

In the case of individual radiation operation, the material to be irradiated is introduced into the radiation chamber 34 at the location 40. The dash line 50 designates a station or position along the circular path of travel of the carriage 32, 180° from the radiation source chamber 36 within the shield 30. Dash lines 51 and 52 denote two similar stations, each 90° from chamber 36. After a charge has been placed in the chamber 34 at station 50, the carriage 32 is rotated through 180°. During the radiation period a second charge may be introduced into the carrier 34 now advanced to the position 50. After expiration of the radiation time, the piston will again be rotated 180° and the charge now located at station 50 will be removed to be replaced with further charges as desired.

In series operation, charges of material to be irradiated will be applied at the three stations 50, 51 and 52 into the chambers of the carriage 32 which are located there, and an automatic drive sequencing apparatus will be started. This will cause the ring 32 to perform automatically four separate rotations each of 90°, at intervals corresponding to the intended radiation exposure times. At the conclusion of these four 90° rotations the three charges will have returned to the stations 50, 51 and 52 and may be removed from the carriage 32 at convenient times.

During the radiation times the motor 43 effects rotation of the source basket 37 at such a rate that the basket executes one or more rotations during the exposure time of each charge.

It will thus be seen that the invention provides irradiation apparatus comprising a radiation shield in which there is formed a substantially horizontal passage extending through the shield so as to have at each end of the passage an opening to the exterior of the shield. The apparatus also comprises a carriage for the support of material to be irradiated. The carriage, sometimes hereinabove referred to as a piston, has collinearly disposed therein at least three radiation-shielding portions spaced from each other by at least two work-supporting portions or chambers. In the radiation-shielding portions thereof the carriage has substantially the same cross-section as the cross-section of the passage through the shield at the ends of that passage. In this way, the radiation-shielding portions of the carriage make it possible to advance the work-supporting portions thereof to a location in the passage within the shield where a radiation source or sources are disposed and, at the same time, the radiation-shielding portions of the carriage effectively block or plug the ends of the passage through the shield. By the provision of two work-supporting chambers or portions spaced from each other along the carriage by a radiation-shielding portion, it is possible to provide for irradiation of material in one chamber while the other chamber is outside the shield for loading and unloading.

While the invention has been described herein in two presently preferred embodiments, the invention itself is not limited thereto, but comprehends all variations and departures therefrom falling within the spirit and scope of the appended claim.

I claim:

1. Irradiation apparatus comprising a radiation-absorbing mass having a circularly arcuate passage of circular cross-section extending therethrough, said passage having a cylindrical enlargement at a location intermediate the ends thereof, a ring of radiation-absorbing material movably supported in and passing through said passage, said ring having a plurality of recesses therein for the reception of material to be irradiated, the cross-section of said ring being substantially equal to the cross-section of said passage, and a rotatable annular support fitting within said enlargement around said ring for support of a plurality of rod-like radiation sources, said mass further having an aperture extending from the exterior thereof to said enlargement in alignment with the periphery of said support for insertion and withdrawal of radiation sources.

References Cited

UNITED STATES PATENTS

| | | | |
|---|---|---|---|
| 2,768,134 | 10/1956 | Fermi et al. | 250—106 X |
| 3,225,203 | 12/1965 | Gombert | 250—108 X |

FOREIGN PATENTS

| | | |
|---|---|---|
| 1,374,660 | 8/1964 | France. |

RALPH G. NILSON, Primary Examiner

A. B. CROFT, Assistant Examiner

U.S. Cl. X.R.

250—108

PO-1050
(5/69)

UNITED STATES PATENT OFFICE
CERTIFICATE OF CORRECTION

Patent No. 3,493,756      Dated February 3, 1970

Inventor(s) B. Latzer

It is certified that error appears in the above-identified patent and that said Letters Patent are hereby corrected as shown below:

Column 4, line 15, "40" should read --50--.

Column 6, insert at line 5 the following:
--2,469,872    5/49    Ellner -------------- 250
   2,907,883   10/59    Jacobs et al. ------ 250
   2,922,884    1/60    Fearnside ---------- 250 --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents